July 8, 1930.  P. B. MAGNUSON  1,770,240
BONE SAW
Filed Oct. 26, 1929
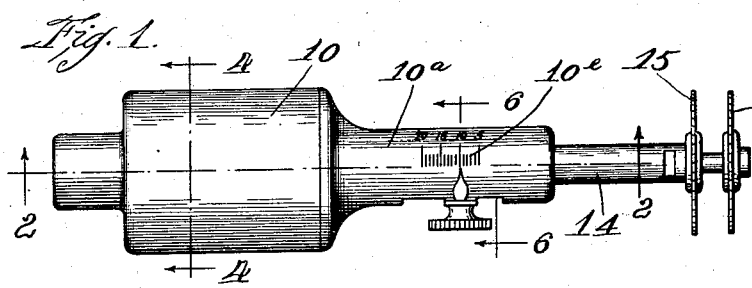
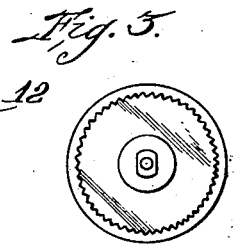
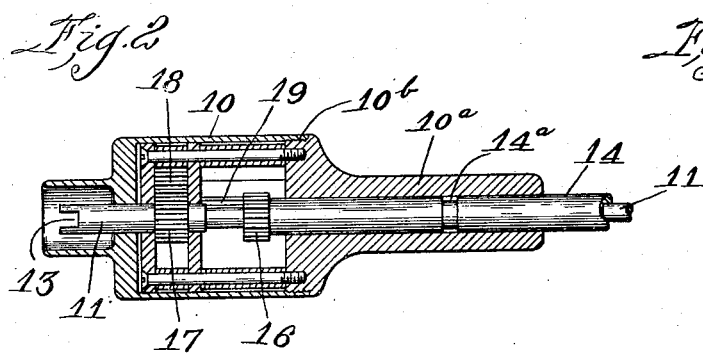
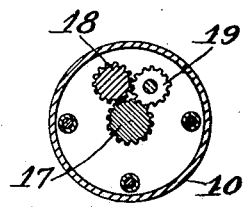
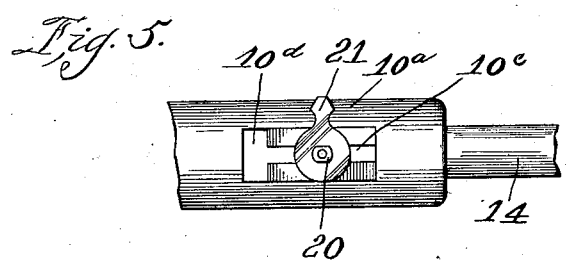
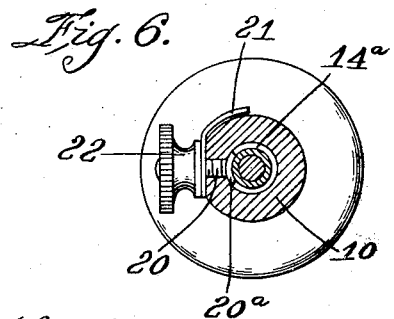
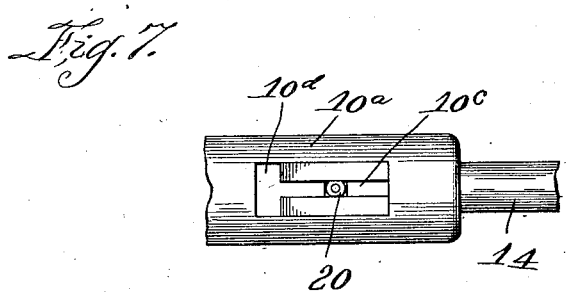
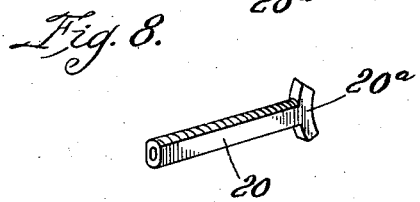
Inventor:
Paul B. Magnuson.
By Dyrenforth, Lee, Chritton and Wiles
attys.

Patented July 8, 1930

1,770,240

UNITED STATES PATENT OFFICE

PAUL B. MAGNUSON, OF CHICAGO, ILLINOIS, ASSIGNOR TO SHARP & SMITH, INC., OF CHICAGO, ILLINOIS, A CORPORATION OF ILLINOIS

BONE SAW

Application filed October 26, 1929. Serial No. 402,642.

This invention relates to improvements in bone saws and, more especially, such saws adapted for use by surgeons in removing portions of bone for grafting purposes.

Among the features of my invention is the provision of a rotary double saw of the character referred to that can be operated from any suitable source of power by means of a flexible shaft.

My improved saw is quiet and smooth in operation. It is also light, compact, and readily manipulated, being especially adapted for application to inaccessible parts of the body.

Another feature of my invention is the provision of means permitting accurate and fine setting or spacing of the two rotary saws, with an improved indicating scale visible while the saw is running. My saw also has the gearing completely housed or guarded, thus protecting the same from dirt and aiding in retaining oil and grease. The saw also may be easily disassembled for repair and replacement purposes.

Other features and advantages of my invention will appear more fully as I proceed with my specification.

In that form of device embodying the features of my invention shown in the accompanying drawings—

Figure 1 is a view in side elevation; Fig. 2 is a sectional view taken as indicated by the line 2 of Fig. 1; Fig. 3 is an end view; Fig. 4 is a view taken as indicated by the line 4 of Fig. 1; Fig. 5 is a detail view of the adjusting mechanism; Fig. 6 is a view taken as indicated by the line 6 of Fig. 1; Fig. 7 is a view similar to Fig. 5 showing the retaining nut removed; and Fig. 8 is a view in perspective of the adjusting rod.

As shown in the drawings, 10 indicates a cylindrical casing with a sleeve extension $10^a$ removably attached thereto by the threaded connection at $10^b$.

Numeral 11 indicates an inner shaft extending entirely through the casing and sleeve extension. This shaft carries a rotary saw 12 on its outer end and a driving connection 13 at the other end for receiving power from a flexible driving shaft (not shown).

Numeral 14 indicates an outer tubular shaft slidably and rotatably mounted on the inner shaft and carrying a rotary saw 15 on its outer end. The inner end of the outer shaft 14 lies inside of the casing 10 and is provided with a gear 16. The inner shaft 11 is also provided with a gear 17 inside of the casing 10.

There is also provided within the casing 10, suitable reverse gearing so that when the shaft 11 is driven in one direction, the shaft 14 will be rotated in the reverse direction. This is accomplished in the following manner. The gear 17 drives the gear which rotates the gear 19. The latter gear drives the gear 16 and thus rotates the shaft 14.

The gear 19 is made long so that the gear 16 can slide on it to permit longitudinal adjustment of the shaft 14 and saw 15. Such longitudinal adjustment is accomplished by the following means. The shaft 14 is provided with an annular groove $14^a$ lying inside of the sleeve extension $10^a$, the latter being provided with a longitudinal slot $10^c$ widened at one end, as indicated by $10^d$. Numeral $10^e$ indicates suitable calibrations on the sleeve extension adjacent the slot $10^c$. Numeral 20 indicates a threaded adjusting rod extending through the slot $10^c$ and carrying a shoe $20^a$ lying in the groove $14^a$ in the shaft 14. Numeral 21 indicates an indicator or pointer carried by the adjusting rod 20 and registering with the calibrations $10^e$ to show the adjustment of the shaft 14 and separation of the saws. The saw 15 is held in any desired adjusted position by a retaining nut 22 threaded on the rod 20 and designed to pull the shoe $20^a$ outwardly into frictional engagement with the inner wall of the extension sleeve $10^a$ when said retaining nut is tightened.

In disassembling the device, the adjusting rod 20 and shoe $20^a$ must be removed before the shaft 14 can be withdrawn. This is accomplished by widening one end of the slot $10^c$, as indicated by $10^d$. This is wide enough to permit withdrawal therethrough of the shoe $20^a$ when the shaft 14 is slid over so that the groove $14^a$ lies under the widened portion $10^d$ of the slot $10^c$.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible, in view of the prior art.

What I regard as new, and desire to secure by Letters Patent, is:

1. A device of the character described, comprising: a casing with a sleeve extension thereon, said sleeve extension having a longitudinal slot therein and provided with calibrations; an inner shaft extending through the casing and the sleeve extension with one end projecting beyond the end of the sleeve extension and carrying a rotary saw, and the other end projecting out of the casing and provided with a driving connection; a gear on the inner shaft in the casing; an outer tubular shaft surrounding the inner shaft extending through the sleeve extension and into the casing, one end of said outer shaft projecting beyond the end of the sleeve extension and carrying a rotary saw, said outer shaft being rotatable and slidable on the inner shaft and provided with an annular groove; a gear in the casing on the outer shaft; reverse gearing in the casing connecting the gears on the inner and outer shafts; an adjusting rod extending through the slot in the sleeve extension and having a shoe lying in the annular groove in the outer shaft; an indicator carried by the adjusting rod and registering with the calibrations on the extension sleeve; and a retaining nut carried by the adjusting rod.

2. A device as claimed in claim 1, in which one end of the slot in the sleeve extension is widened to permit withdrawal therethrough of the shoe or the adjusting rod in disassembling the device.

In witness whereof, I have hereunto set my hand this 24th day of October, 1929.

PAUL B. MAGNUSON.